United States Patent [19]
Sandblom

[11] 3,792,271
[45] Feb. 12, 1974

[54] MEANS FOR DETERMINING MOISTURE CONTENT AND/OR SURFACE WEIGHT

[75] Inventor: Henry Sandblom, Vasteras, Sweden

[73] Assignee: Allmanna Svenska Elektriska Aktiebolaget, Vasteras, Sweden

[22] Filed: June 30, 1972

[21] Appl. No.: 268,116

Related U.S. Application Data

[63] Continuation-in-part of Ser. No. 236,315, March 20, 1972, abandoned.

[52] U.S. Cl. .............................. 250/347, 250/349
[51] Int. Cl. .............................................. G01t 1/16
[58] Field of Search .......... 250/83.3 H, 83.3 D, 347

[56] References Cited
UNITED STATES PATENTS
3,228,282   1/1966   Barker, Jr. .................... 250/83.3 D
3,150,264   9/1964   Ehlert ........................... 250/83.3 H
3,660,663   5/1972   Guildford ...................... 250/83.3 H

*Primary Examiner*—James W. Lawrence
*Assistant Examiner*—Davis L. Willis
*Attorney, Agent, or Firm*—Jennings Bailey, Jr.

[57] ABSTRACT

An arrangement for determining moisture content, surface weight or other properties of travelling paper webs includes two detectors, at least one of which is arranged stationarily at one side of the path of the web, along with a comparison device to which the detectors are connected. Light is supplied to the fixed detector by a stationary mirror, and to the other detector by a mirror system which is movable across the web.

6 Claims, 8 Drawing Figures

MEANS FOR DETERMINING MOISTURE CONTENT AND/OR SURFACE WEIGHT

RELATED APPLICATIONS

This application is a continuation-in-part of application Ser. No. 236,315, filed Mar. 20, 1972 now abandoned.

BACKGROUND OF THE INVENTION

1. Field of the Invention

The invention relates to determining moisture content, surface weight or other characteristics of a paper web.

2. The Prior Art

An arrangement is knwon in which a paper web passes a measuring point with a measuring head with an infrared lamp on one side of the web and a second measuring head consisting of a detector connected with a compairson device on the other side of the web. If the first measuring head traverses the web, the second measuring head also traverses the web synchronously. In the first measuring head there is a rotating filter plate and beams from an infrared source are permitted to pass alternately through one type of filter and then another in the filter plate and through the paper to the detector and another type of filter. One of the filters is so chosen that the emitted ray has a wavelength which is strongly absorbed by the water (moisture) in the paper web and the other filter is so chosen that the ray emitted has a wavelength which is not absorbed by the water in the paper. By alternately measurng the radiation intensity passing through the web for one and for the other wavelength, a measurement is obtained of how much intensity is absorbed by the water and thus a measurement of the miosture content. The surface weight, ash content, and the like of the paper can be measure in a similar manner.

In another measuring method, one of the measuring heads has a radiation source and the other two detectors, one for a reference ray, the other one for the measuring ray. The beam from an infrared lamp passes through the paper web and then to a beam splitter. Part of the ray is then reflected through a filter permitting the reference beam to pass through to the reference detector, part of the beam passing through the beam splitter and through another filter permitting the measuring beam to pass through to the measuring detector.

Since a portion of the beam passing through the paper web will be absorbed by the moisture in the web and since this absorption only affects the measuring beam, a comparison of the signals from the two detectors will give a measure of the moisture content in the paper web.

In order to obtain a measuring signal of the moisture content, the output signals from the two detectors must be compared in the comparison member the output of which gives a measurement of the moisture content. The measuring and reference signals in this case refer to the same moments. The two measuring heads traverse simultaneously across the web. This method may be also used for measuring the microstructure of the paper.

The measuring heads used for these methods are rather larger and must be transported to and fro across the direction of movement of the paper web. The beams for carrying them will therefore also be rather strong and the constructions expensive. A bundle of electric cables must also be led to the movable measuring heads which causes added complication. The measuring heads and traversing equipment are often precision jobs. The temperature sensitivity of the equipment in the measuring heads and of the carrying beams (because of thermal stress and bending) means that the equipment cannot normally be mounted in warm places (which would often be desirable).

SUMMARY OF THE INVENTION

The invention aims at a solution of these and other similar problems and is characterised in that on one side of the paper web (for example the upper side), displaceably mounted on a beam extending straight across the web, a mirror or a mirror and/or lens system is arranged to direct the radiation from the source through the paper against either a similarly displaceable mirror or a mirror and/or lens system on the other side of the paper (for example the lower side), which in turn reflects the radiation against a detector, or against a detector travelling in synchronism with the first mirror, the output signal of the detector being dependent on the moisture content or the surface weight of the paper, the radiation source and/or the detectors being placed at the side of the paper web. In such a device all the heavy equipment or at least a substantial part of it is placed at the side of the paper web and the light mirror (s) will traverse the web. Equipment can thus be obtained which can be positioned in warm places, for example inside the drying section of a paper machine.

DESCRIPTION OF THE PREFERRED EMBODIMENTS

Figure 1:
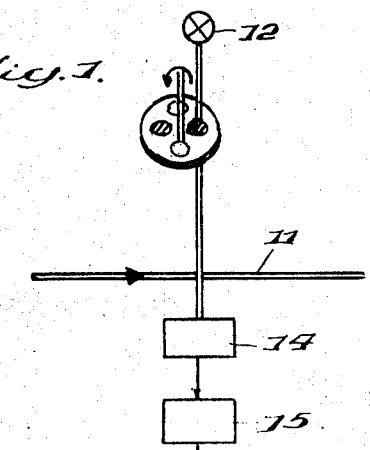
FIG. 1 shows diagrammatically a device known in the prior art.
Figure 2:
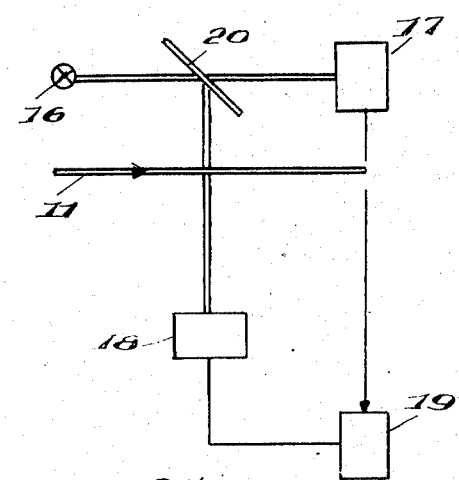
FIG. 2 is a similar view of another known construction.
Figures 3, 3A:
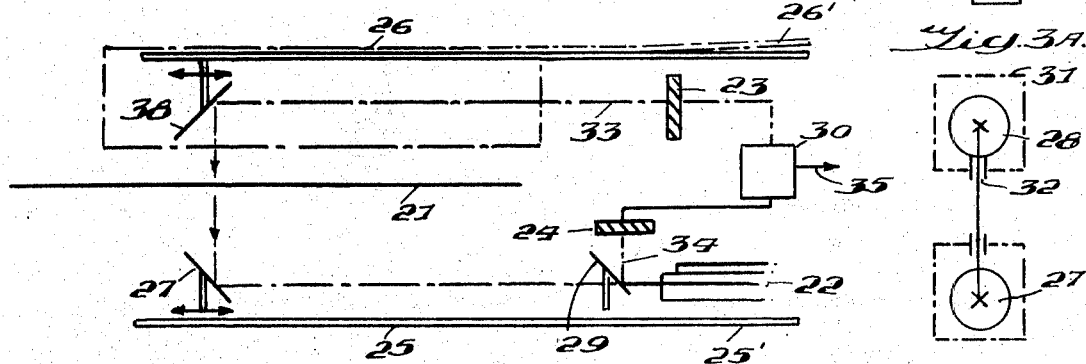
FIG. 3 shows an arrangement according to the invention.
FIG. 3A is a detail of a part of FIG. 3.

FIG. 3 shows an embodiment of the invention applied in a paper machine. Outside a paper web 21 are assembled one or more radiations sources 22 (infrared sources, infrared laser sources, light diodes or the like) and one or more detectors in this case two, 23, 24, one 23 for radiation which passes through the paper and is absorbed to a certain extent by the water in it, and one 24 as a reference detector for this radiation. If the sources are suitably designed, concentrated, parallel bundles of rays are obtained which are directed along the paper web 21 in its transverse direction. On the travelling beams 25, 26 above and below the paper web 32 are inclined mirrors (the angle of inclination may be adjustable) 27, 28 or mirror or lens systems. These mirrors reflect the ray bundles through the paper web 21 and to one or more detectors 23 at the side of the paper web. It is also possible to turn the mirror 28 which is located after the passage of the web so that it reflects the beam through the web again to the first mirror 27 and to the edge of the web where detectors are mounted. See also Swedish application No. 3546/71 describing a moisture measuring device.

A certain amount of the radiation emitted by the source 22 is reflected in an earlier located stationary mirror 29 towards a second detector 24 (reference detector), and the output signals from these two detectors 23 and 24 are supplied to a comparison device 30, the output signal of which is the difference between or quotient of the measurement and reference signals and thus a measurement of the moisture content or surface weight of the paper. This stationary mirror 29 may be of a rotating type with alternating holes and mirrors to reflect the beam part of the time and let it through another part of the time. The water content, thickness or other parameter in the web causes a certain absorption of the radiation passing through the web and, by a suitable choice of radiation wavelengths, it is possible to obtain an accurate measurement of moisture content or surface weight by measuring the radiation which has passed through the paper. A combination of the means described here and surface weight measurement based on B-radiation absorption can also be arranged.

It is unavoidable that the beams 25, 26 bend because of uneven heating when they are located in a warm place. Since the planes of the mirrors 27, 28 may then also be changed, means are necessary to compensate this so that, in spite of the curve in the beams, the bundle of rays will still hit the detectors 23 (24). An easy way of compensating for this phenomenon is to make sure that the beams curve equally and in the same direction. This can be accomplished if both beams are made equally strong and have great bending resistance laterally. Thus, if the beams bend upwardly, for example, and to the same extent upon heating, it is of no consequence and the beams will still hit the detectors. Parallel displacement of the beams because of their bending does not matter. There are only light mirrors which are being moved along the beams 25, 26 during the traversing and not heavy (and sensitive) measuring equipment.

A further method of correcting the duration of the light beam direction is to install a curved mirror or curved mirror/lens-system in front of the detector/detectors 23 so that the radiation always falls upon the detector window.

It is important that the mirrors 27, 28, 29 are kept clean and this can be achieved either by allowing them to rotate or be moved to and fro against cleaning brushes. Alternatively, the brushes may be allowed to rotate or move to and fro over the surface of the mirrors. The surfaces can also be blown clean with air or wipers may be arranged similar to windscreen wipers in a car.

In order to prevent dust and drops of water from disturbing the path of the beam, the beams 26, 27 may be in the shape of boxes or tubes (see 31), and the mirrors 27, 28 may be inserted inside these tubes 31, a narrow gap 32 being arranged facing the paper web 21 to permit passage of the beam through the web. For most of the way, therefore, the beam travels inside the box or tube, and dry, clean air can at the same time be blown into this.

The basic construction is shown in FIG. 3 and two alternatives are possible. In the first alternative, one part of the radiation is deviated before the passage of the paper web and fed to the reference detector 24, and the other part of the radiation is transmitted through the web under partial absorbtion and fed to the detector 23. The outfeed signals of both the detectors are fed to a comparison member 30.

In the second alternative the total radiation is transmitted through the web and fed to the detector 23, however, the radiation comes from two radiant sources or a double radiant source, such as a laser source with two rays of different wave lengths, one with a wave length not absorbed by water or cellulose in the web, one being absorbed. Both webs are fed through the paper web to the mirror 38 and from this to two corresponding detectors 23 (here shown as one object). This may be arranged by mutual adjustment of the two rays or making the two rays somewhat angular to each other. Both are different in wave length. One portion is strongly absorbed in the water of the web, for example 1.93 microns and the other portion just slightly, for example 1.7 – 1.8 micron wave length. The size of the deviation of the output from said detector 23 is a measure of the water content in the web.

If surface layers are to be measured a third laser may be used, for example with a wave length of 2.11 $\mu$, and a third detector 23.

The quantity of cellulose (and other paper components) can also be measured with the infrared technique in the same way as the moisture content measurement. A different wavelength must, however, be chosen (2.11 $\mu$ or 3.45 $\mu$ has been proposed according to the literature). Yet another beam of one or both of these wavelengths should then be added.

The most usual method of measuring surface weight of paper nowadays is by absorption of $\beta$-rays. A measuring head on one side of the paper web contains the radioactive source of radiation and a second on the other side of the paper contains the detector (for example an ionization chamber). The moisture measuring principle described here can easily be combined with the surface weight measurement. Apertures are for example provided straight through both measuring heads, perpendicular to the plane of the paper and the rays are led through these apertures. For example on the upper side of the measuring heads (on the side facing the paper web) mirrors (27,28) are arranged. The path of the rays is then preferably arranged in the beam system of the surface weight equipment.

The methods proposed here can also be used within other fields, for example for measuring the thickness of coatings within the plastic industry.

If the light becomes too spread in the parallel bundles of rays during passage through the paper, special precautions must be taken so that sufficient intensity reaches the detecors.

An infrared camera or the like (23) may be used as a detector. It should be placed at the side of the web and advantage of such a camera is that it has its own focusing means.

According to an alternative, a mirror 28 may be replaced by a lens arrangement or the like, which, besides directing the bundles of rays towards the detectors 23, also has the task of focusing. The focusing of the lens system may be connected to the position of the lensmirror arrangement so that the lenses are always correctly adjusted.

Figure 5:
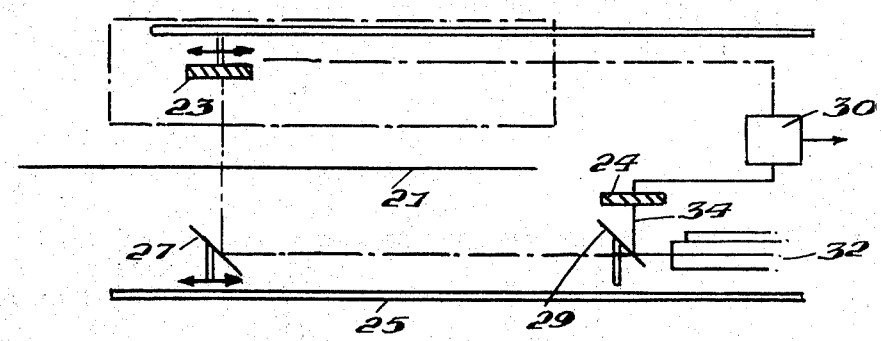
FIG. 5 shows a modification of the device of FIG. 3.

According to another alternative (see FIG. 5), the mirror 28 may be replaced by a travelling detector 23, in which case the radiation source 22, detector 24 and comparison device 30 can still be in fixed positions outside the edge of the paper web.

For particularly thick types of paper it may be necessary or advantageous to use reflected radiation from the paper web instead of radiation passing through the web. However, this is no different as far as the traversing members are concerned, from that described above.

It is known that a paper breakage in a paper machine is preceded by a certain degree of instability in such process variables as surface weight, moisture content and the like (as well as pressures in the inlet box, level in the machine chest, tension in the paper web, etc.). Such instability sometimes starts up 10 minutes or more before the web reaks. Correspondingly if the products of chemical processes do not come up to the specifications stipulated for a certain quality, this is often due to the various parameters or variables in the process and are outside the presented limits, and as described above long time before such a situation occurs, the variables often show signs of instability. An excellent help, in combination with the devices described above, is a processing computer, a reading in, supervising and calculating program and an operator's communication with TV screen typewriter and operator's panel with appropriate equipment. The signals obtained may be used for control of surface weight and moisture content at paper machines, for example by the aid of a computer.

By reading, for example, the output signals 35 from comparison device 30, an average value over a certain period is calculated and either the width of variation, standard deviation or variation coefficient. The normal value for any of these magnitudes has been indicated in advance. When a variable becomes unstable, this is first noticed when the width of variation, standard deviation and variation coefficient fall outside the limits given and an alarm can be given. For their operator's communication there is first of all a TV screen which suitably states in table form:
signal number
average value
width of variation range, standard deviation and variation coefficient or the like.

When the limits of these values are exceeded an alarm is given and along with this an asterisk and/or underlining of the signal in question. At the same time an output is obtained on the typewriter. When the operator has taken corrective steps and the signal has returned to normal, the asterisk and underlining disappear and a new transcript is obtained with time indications.

The information shown at any particular time on the TV screen can be writted out on the typewriter is requested by the operator.

Finally, the operator's panel is used to set the values of the width of variation, standard deviation, or the like which are to be considered as normal values, and also to acknowledge alarms, request transcripts, and so on.

In order to determine the normal values to be set as limit values for the width of variation or other measurements, the figures on the TV screen should be studied at some time when the paper machine (or process) is running well, and when the instability is relatively low. The values showing standard deviation or the like can then be used to determine the limits to be set with the help of the operator's panel.

The latter equipment is an example of how the signals emitting at 35 can be made use of.

Figure 4A:
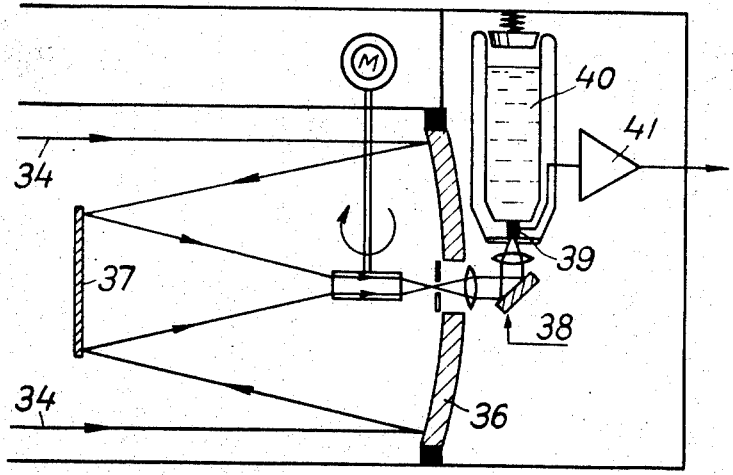
FIG. 4A shows a detector arrangement used in the device of FIG. 3.
Figure 4B:
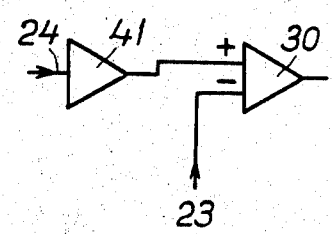
FIG. 4B shows the connections to such a detector.
Figure 4C:
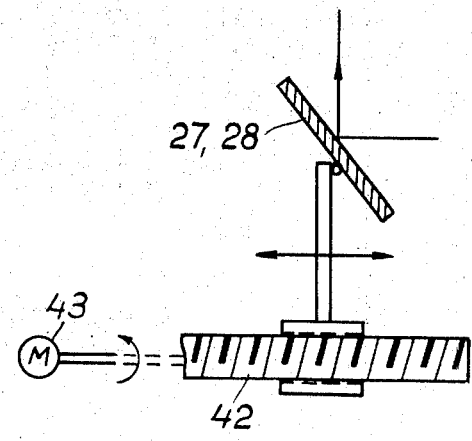
FIG. 4C shows a mirror mounting arrangement.

Many kinds of detectors used in this field can be used for this invention. One example is described by Hudson in "Infrared System Engineering," John Wiley & Sons, 1969, for example on page 354. FIG. 4A shows such a detector for infrared radiation where, after reflection against mirrors 27 and 29, (FIG. 4 C) the radiation reaches the detector 23, 24 (FIG. 3). The radiation beam 34 (FIG. 4 A), is reflected against a lens 36 and a mirror 37 and by means of a lens system 38 focused on an In-Sb detector 39 at the bottom of a container 40 containing liquid $N_2$. The output of said In-Sb detector is fed to an amplifier 41, the output of which is fed to the comparison device 30 (FIG. 4 B), here an amplifier.

The output from the reference detector 23, which is similar to the detector shown in FIG. 4A, is also fed to the comparison device.

The mirrors 27 and 28 are movable by means of rotatable gear shafts 42 (FIG. 4C) or the like, driven by a motor 43.

One very suitable form of radiant source is a laser source 22 (32), which as shown in FIG. 3 should be placed at the side of the paper web. Parallel rays are obtained, which may be reflected in the traversing mirror 27 and thereafter transmitted through the paper web. The use of a laser radiant source makes the positioning of the source at the side of the web easier.

Opposite this mirror 27 there is another mirror 28, placed in 45° angle. The detector at the side of the path 23, which may also be an infrared camera, emits the rays from the second mirror 28.

By using laser technique it is possible to use a monochromatic light, i.e. one laser for each wave length (for example 1.93 $\mu$, 1.7–1.8 $\mu$, 2.1 $\mu$), and rotating filters are made unnecessary.

Lasers may be mutually displaced sidewards in order to separate the different rays and different detectors, such as infrared cameras, may measure different rays, or one camera or detector may successively measure one ray after the other.

The laser radiation sources may be used for obtaining different rays of different wave lengths through the web. The number of traversing mirrors may be two and the number of stationary detectors on or two (or more). The laser radiant source may be of the type shown in L Signet Transmission and Ranging Systems or Laser-Kurzelhrgang (Dandliker) described in Laser und angewandte Strahlentechnik Nr 1/1971.

The invention may be varied in ways within the scope of the following claims.

I claim:

1. Apparatus for determining properties of a web comprising support means including at least one beam extending transversely of the path of a travelling paper web, a stationary comparison device at one side of said path, detector means comprising a stationary comparison device connected to said comparison device, a source of radiant energy, first means to supply energy from said source to said stationary comparison device, second means carried by said beam and movable across said path to pass radiant energy through successive sidewards displaced portions of said web, and third means to furnish to said comparison device a signal representing the amount of energy passing through the measured width of said web.

2. Apparatus as claimed in claim 1, which comprises a second stationary detector device, and in which said third means includes fourth means movable across the path to reflect radiant energy passing through the web to said detector.

3. Apparatus as claimed in claim 2, in which said second means comprises fifth means movable across said path opposite said fourth means to reflect energy from said source through the web to said fourth means.

4. Apparatus as claimed in claim 3, including a housing enclosing said fifth means and movable therewith.

5. Apparatus as claimed in claim 1, in which said third means includes a second detector device forming part of said detector means movable across said path opposite said second means.

6. Apparatus as claimed in claim 1, in which the source of radiant energy emits laser rays.

* * * * *

UNITED STATES PATENT OFFICE
CERTIFICATE OF CORRECTION

Patent No. 3,792,271         Dated February 12, 1974

Inventor(s) Henry Sandblom

It is certified that error appears in the above-identified patent and that said Letters Patent are hereby corrected as shown below:

On the title page, the following should be added:

[30] Foreign Application Priority Data
    Mar. 19, 1971    Sweden    3548/71

Signed and sealed this 5th day of November 1974.

(SEAL)
Attest:

McCOY M. GIBSON JR.            C. MARSHALL DANN
Attesting Officer              Commissioner of Patents